Sept. 23, 1941.  H. SUGARWATER  2,256,929
AUTOMATIC GEAR SHIFT MECHANISM
Filed Nov. 16, 1938  2 Sheets-Sheet 1

Inventor
Harold Sugarwater
by Henry Blesh
Attorney.

Sept. 23, 1941.   H. SUGARWATER   2,256,929
AUTOMATIC GEAR SHIFT MECHANISM
Filed Nov. 16, 1938   2 Sheets-Sheet 2
Fig.2
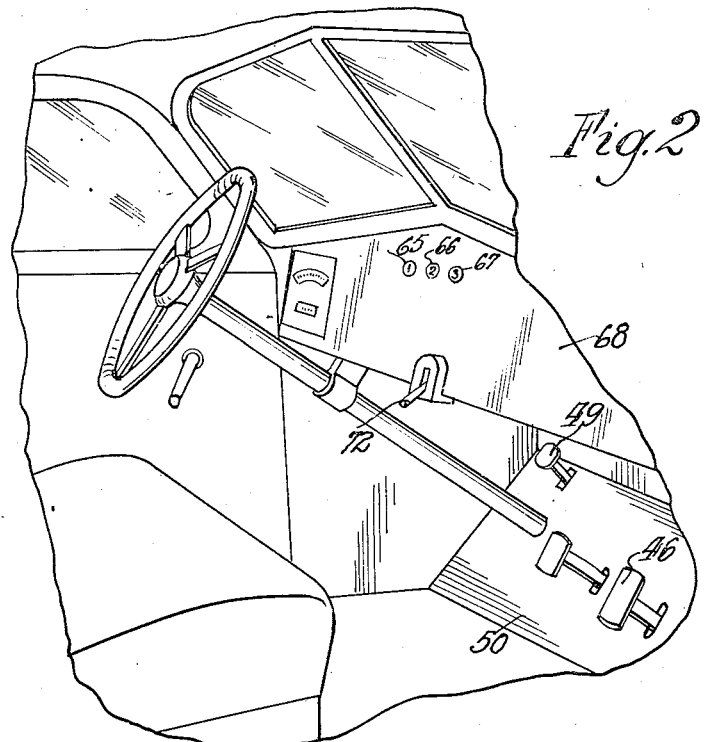
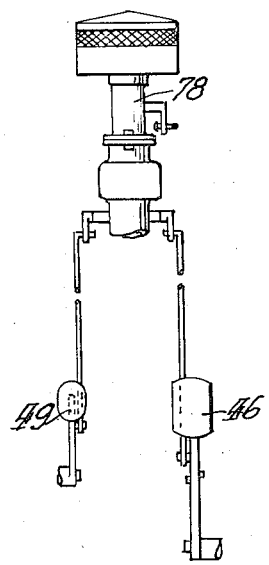
Fig.3
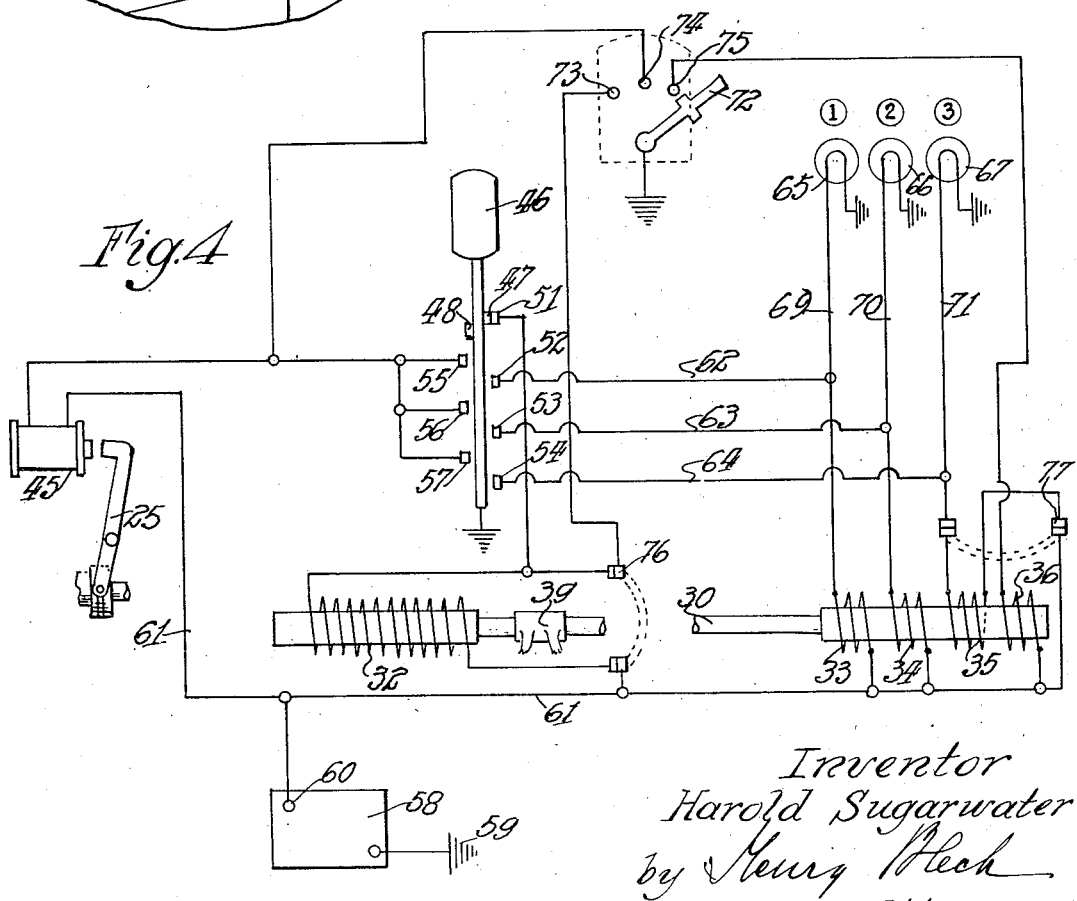
Fig.4
Inventor
Harold Sugarwater
by Henry Blech
Attorney.

Patented Sept. 23, 1941

2,256,929

UNITED STATES PATENT OFFICE 2,256,929

AUTOMATIC GEAR SHIFT MECHANISM

Harold Sugarwater, Chicago, Ill., assignor of one-fourth to Charles Mann and fifteen per cent to Henry Blech, both of Chicago, Ill.

Application November 16, 1938, Serial No. 240,755

14 Claims. (Cl. 192—.01)

The invention relates to automatic gear shifting mechanism wherein the shifting of the transmisson gears to provide various speeds of the motor vehicle is effected concomitantly with and automatically by the gas feed to the motor.

It is an object of the invention to provide a mechanism for automatically shifting gears controlled by the actuation of the accelerator pedal.

A further object constitutes the provision of solenoids which are mechanically connected with the gear engaging means and whose circuits are controlled by the accelerator.

A further object is the provision of indicating means on the dashboard to apprise the driver of the particular speed at which the car is traveling.

Another object is the provision of a circuit breaker which disconnects the solenoid after high speed has been attained so as to prevent weakening of the battery from which the solenoid derives electrical energy.

With these and other important objects in view which will become apparent from a perusal of the invention, the latter comprises the means described in the following specification, particularly pointed out in the claims forming a part thereof, and illustrated in the accompanying drawings, in which:

Fig. 2 is a fragmentary perspective view of the front part of a motor vehicle,

Fig. 3 is an elevational view of a carburetor controlled by a main and auxiliary accelerator, and Fig. 4 is a wiring diagram.

Figure 1:
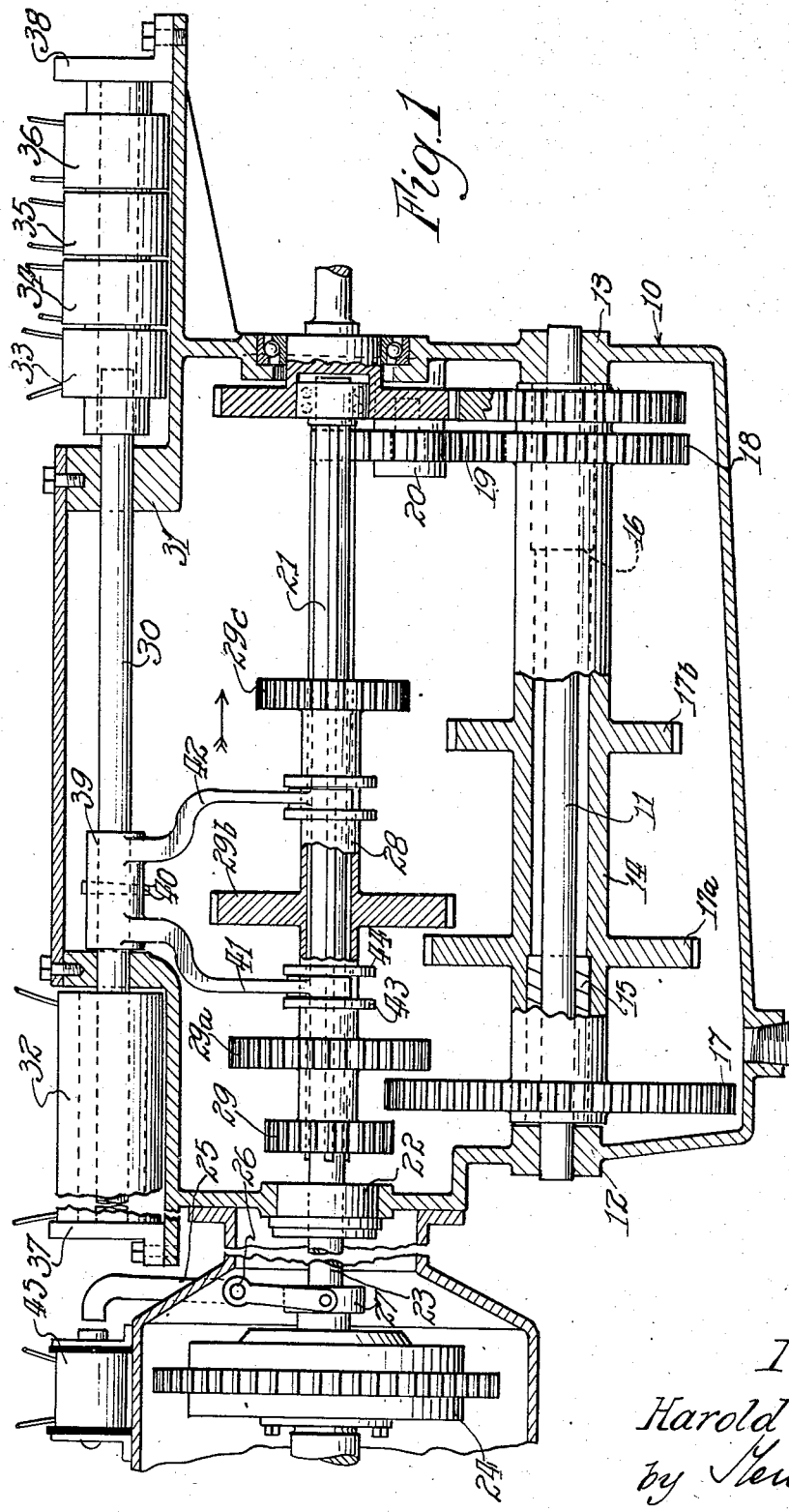
Fig. 1 is a section through the transmission of a motor vehicle.

Referring to the several views of the drawings, 10 designates a transmission casing for a motor vehicle in which an axle 11 is supported in bearings 12 and 13, and is surrounded by a sleeve 14 coextensive with said axle and mounted for rotation thereon by roller bearings 15 and 16.

The sleeve 14 has secured thereto driven gears 17, 17a, 17b, which vary in diameter to provide the various speeds for the vehicle. The sleeve 14 also has a reversing gear 18 meshing with an idler gear 19 mounted for rotation on a stud shaft 20.

Adjacent to and parallel with the axle 14 is a driving shaft 21 which, by a clutch 22, may be coupled to an engine shaft 23 on which a fly wheel 24 is fast.

A lever 25 is fulcrumed about a pivot 26 and is articulated with a ring 27, adapted to control the clutch 22 to either connect or disconnect the driving shaft 21 from the motor shaft 23.

A sleeve 28 is splined on the driven shaft 21 and has secured thereto driving gears 29, 29a, 29b and 29c which, respectively, are adapted to mesh with appertaining gears 17, 17a and 17b, in order to obtain the desired speed.

Gear 29 is adapted to mesh with gear 17, gear 29a with 17a and gear 29b with gear 17b. Gear 29c is adapted to mesh with idler gear 19 to effect rotation of sleeve 14, in reverse direction, as will be readily understood by those versed in the art.

The parts heretofore described are standard equipment and do not per se form a part of the invention.

A sliding shaft 30 projects through the reduced upper casing portion 31 and carries at the left protruding end, as viewed in Fig. 1, a solenoid 32, whereas the right protruding end of the shaft carries four solenoids, designated respectively by 33, 34, 35 and 36.

The shaft 30 constitutes a common armature for the various solenoids and is supported at its ends in brackets 37 and 38 upstanding from casing 10, and is also supported in apertures provided in the walls of the reduced casing portion 31.

A sleeve 39 is secured to the shaft 30 by a cross pin 40, and is integral or has secured thereto arms 41 and 42, whose lower bifurcated ends enter between collars 43 and 44 so that, upon sliding movement of shaft 30, the sleeve 28 is entrained and participates in such sliding movement to cause a gear thereon to mesh with a gear on the sleeve 14.

A solenoid 45 is mounted on the casing 10 and is juxtaposed to the upper end of the lever 25, so that when the solenoid is energized, the lever tilts and causes disengagement of the clutch.

Referring to Fig. 2, the vehicle has the standard accelerator pedal 46 on whose stem are provided contact points 47 and 48.

An auxiliary pedal 49 is also provided in the floor board 50 for a purpose hereinafter referred to.

The contact 47 is adapted to enter into successive engagement with contact points 51, 52, 53 and 54, whereas the contact 48 is adapted to engage with contact points 55, 56 and 57. The various contact points are mounted below the floor board in the path of the respective contact of the accelerator, to be engaged thereby upon depression of the accelerator.

A battery 58 is grounded at one side, as at 59, and in its other terminal 60 is connected to a main wire 61, to which are connected at one end the various solenoids 33, 34, 35 and 36.

The main wire 61 also leads to the winding of solenoids 45, which is connected to the contact points 55, 56 and 57.

As shown, the contact point 52 is connected with solenoid 33, contact point 53 with solenoid 34, and contact point 54 with solenoid 35, respectively, by wires 62, 63 and 64.

Signal lights 65, 66 and 67, grounded on one side and mounted on the dash board 68, are connected to solenoids 33, 34 and 35, respectively, by branch wires 69, 70 and 71, respectively.

In operation, the accelerator normally is in the position shown in Fig. 4, wherein the contact 47 engages the point 51, which is the neutral position in which the solenoid 32 is energized and holds the sleeve 28 and the gears out of mesh.

Upon depression of the accelerator, at first the contact 48 engages point 55, closing a circuit through solenoid 45, causing the lever 25 to tilt and thereby disengaging the clutch. The continued movement brings contact 47 in engagement with point 52, thereby energizing solenoid 33, which causes shifting of the slide shaft 30 and meshing of gears 29 and 17, thereby placing the vehicle in first speed.

If the accelerator is further depressed the contact 48 engages point 56 to again release the clutch and thereafter contact 47 contacts point 53, to energize the solenoid 34 and further shifting the shaft 30 to cause gears 29a and 17a to meet, thereby placing vehicle in second speed.

The further depression of the accelerator will automatically cause gears 29b and 17b to mesh to obtain third speed.

As the various speeds are obtained, the lights 65, 66 or 67 will light up, thus giving the driver a visible signal as to the particular speed obtained.

When it is desired to drive in reverse, a lever 72 on the dash board is actuated, which successively engages contact points 73, 74 and 75. When the lever is on point 73, it is in neutral position; on point 74, the clutch is disengaged and on point 75, solenoid 36 is energized, causing gear 29c to mesh with idler 19, thus driving gear 18 in reverse direction.

A circuit breaker 76 is provided for the solenoid 32 to automatically open the circuit therethrough after the neutral position of the gears have been attained to relieve the battery from the load.

Likewise, a circuit 77, for the solenoid 35, opens the circuit therethrough to relieve the battery when the vehicle attains third speed.

Where first or second speed is to be maintained for any length of time, such as when steep hills or mountains are encountered, the auxiliary accelerator 49 is used, which controls the gas feed to the carbureter 78, independent of the accelerator 46, and is used like any standard accelerator.

While the drawings show a preferred embodiment of the invention, numerous changes and alterations may be made without departing from the spirit of the invention.

I, therefore, do not limit myself to the details of construction or arrangement of parts, but claim my invention as broadly as the state of the art permits.

I claim:

1. In a motor vehicle, a change speed gear having a driving member, a driven member, a plurality of gear trains comprising driven gears and driving gears, said driving gears being unitarily movable in axial direction and affording different speed ratios between said members, an accelerator, and means including electro-magnets and controlled by said accelerator for directly moving said driving gears for selectively engaging one of said driven gears.

2. In a motor vehicle, a change speed gear having a driving member, a driven member, a plurality of gear trains comprising driven gears and driving gears, said driving gears being unitarily movable in axial direction and affording different speed ratios between said members, an accelerator, means for moving said driving gears for selectively engaging one of said driven gears, and means directly actuated by said accelerator for operating said moving means.

3. In a motor vehicle, a change speed gear having a driving member, a driven member, a plurality of gear trains comprising driven gears and driving gears, said driving gears being unitarily movable in axial direction and affording different speed ratios between said members, an accelerator, means for moving said driving gears for selectively engaging one of said driven gears, and means including solenoids and actuated by said accelerator for operating said moving means.

4. In a motor vehicle, a change speed gear having a driving member, a driven member, a plurality of gear trains comprising driven gears and driving gears, said driving gears being unitarily movable in axial direction and affording different speed ratios between said members, an accelerator, means for moving said driving gears for selectively engaging one of said driven gears, and a plurality of solenoids energized by the actuation of said accelerator for operating said moving means.

5. In a motor vehicle, a change speed gear having a driving member, a driven member, a plurality of gear trains comprising driven gears and driving gears, said driving gears being unitarily movable in axial direction and affording different speed ratios between said members, an accelerator, means for moving said driving gears for selectively engaging one of said driven gears, and a plurality of solenoids having their armature connected with said gear moving means and energized through said accelerator.

6. In a motor vehicle, a change speed gear having a driving member, a driven member, a plurality of gear trains affording different speed ratios between said members, an accelerator, means for selectively engaging said gear trains one at a time, and a plurality of solenoids having a common armature connected with said gear engaging means and energized through said accelerator.

7. In a motor vehicle, a change speed gear having a driving member, a driven member, a plurality of gear trains affording different speed ratios between said members, said gear trains comprising driven gears and driving gears, said driving gears being unitarily movable in axial direction and an accelerator, means for moving said driving gears for selectively engaging one of said driven gears, a plurality of solenoids having their armature connected with said gear moving means, a plurality of contacts in circuit with said solenoids and adapted to be successively engaged by said accelerator to close the respective circuits.

8. In a motor vehicle, a change speed gear having a driving member, a driven member, a plurality of gear trains comprising driven gears and driving gears, said driving gears being unitarily movable in axial direction and affording different speed ratios between said members, an accelerator, means for moving said driving gears for selectively engaging one of said driven gears, and a plurality of solenoids mechanically coupled to said gear moving means and electrically coupled to said accelerator.

9. In a motor vehicle, a change speed gear having a driving member, a driven member, a plurality of gear trains comprising driven gears and driving gears, said driving gears being unitarily movable in axial direction and affording different speed ratios between said members, an accelerator, means for moving said driving gears for selectively engaging one of said driven gears, a plurality of solenoids mechanically coupled with said gear moving means and electrically coupled with said accelerator, and means for disconnecting one of said solenoids subsequent to establishing the appertaining gear train.

10. In a motor vehicle, a change speed gear having a driving member, a driven member, a plurality of gear trains comprising driven gears and driving gears, said driving gears being unitarily movable in axial direction and affording different speed ratios between said members, an accelerator, striker means for said driving gears, and a plurality of solenoids mechanically connected to said striker means and electrically controlled by said accelerator.

11. In a motor vehicle, a change speed gear having a driving member, a driven member, a plurality of gear trains affording different speed ratios between said members, an accelerator striker means for said gear trains, and a plurality of solenoids having a common armature connected to said striker means and electrically controlled by said accelerator.

12. In a motor vehicle, a change speed gear having a driving member, a clutch therefor, a driven member, a plurality of gear trains affording different speed ratios between said members, an accelerator, means for selectively engaging said gear trains one at a time, a plurality of solenoids having their armature connected with said gear engaging means and controlled by said accelerator, and a solenoid mechanically connected with said clutch and solely controlled by said accelerator.

13. The combination with a change speed gear having a driving member, a motor for said driving member, a driven member, a plurality of gear trains affording different speed ratios between said members, an accelerator for said motor, means for selectively engaging said gear trains one at a time, and a plurality of solenoids having their armature connected with said gear engaging means and solely controlled by said accelerator.

14. The combination with a change speed gear having a driving member, a motor therefor, a clutch between said driving member and said motor, a plurality of gear trains affording different speed ratios between said members, an accelerator for said motor, means for selectively engaging said gear trains one at a time, a plurality of solenoids having their armature connected with said gear engaging means and controlled by said accelerator, and a solenoid mechanically connected with said clutch and controlled by said accelerator.

HAROLD SUGARWATER.